United States Patent
Vignocchi et al.

(10) Patent No.: US 9,517,404 B2
(45) Date of Patent: Dec. 13, 2016

(54) APPARATUS, SYSTEM, AND METHOD FOR EFFECTUATING MODIFICATIONS TO A VIRTUAL SPACE RESPONSIVE TO TOKEN DETECTION

(71) Applicant: Disney Enterprises, Inc., Burbank, CA (US)

(72) Inventors: John G. Vignocchi, Studio City, CA (US); Jieun Kim, San Diego, CA (US); Afsoun Yazdian, Glendale, CA (US); Armen Mkrtchyan, Glendale, CA (US); Robert Nelson, Salt Lake City, UT (US); Tracy Thurman, Torrance, CA (US); Jeffrey Bunker, Cedar Hills, UT (US); John Blackburn, Bountiful, UT (US)

(73) Assignee: Disney Enterprises, Inc., Burbank, CA (US)

( * ) Notice: Subject to any disclaimer, the term of this patent is extended or adjusted under 35 U.S.C. 154(b) by 39 days.

(21) Appl. No.: 13/727,413

(22) Filed: Dec. 26, 2012

(65) Prior Publication Data

US 2014/0179443 A1   Jun. 26, 2014

(51) Int. Cl.
*A63F 13/21* (2014.01)
*A63F 13/98* (2014.01)
*A63F 13/40* (2014.01)

(52) U.S. Cl.
CPC ............ *A63F 13/02* (2013.01); *A63F 13/10* (2013.01); *A63F 2300/5553* (2013.01); *A63F 2300/8082* (2013.01)

(58) Field of Classification Search
CPC ... A63F 13/02; A63F 13/10; A63F 2300/5553
(Continued)

(56) References Cited

U.S. PATENT DOCUMENTS 5,190,285 A   3/1993   Levy et al. .................. 273/85 G
5,766,077 A * 6/1998   Hongo ............................ 463/30
(Continued)

FOREIGN PATENT DOCUMENTS

CN   103902281   7/2014
EP   2749332     7/2014
(Continued)

OTHER PUBLICATIONS

U.S. Appl. No. 60/151,586, filed Aug. 30, 1999 in the name of Tony Forrest Rodriguez, 4 pages.
(Continued)

*Primary Examiner* — Ronald Laneau
*Assistant Examiner* — Ross Williams
(74) *Attorney, Agent, or Firm* — Sheppard Mullin Richter & Hampton LLP (57) ABSTRACT

Exemplary implementations may facilitate modifications to characters and/or virtual items within a virtual space, or to the virtual space itself, made responsive to detection of a token. In some implementations, a physical accessory may depict a character in the virtual space. By way of non-limiting example, the physical accessory may include a toy figurine resembling the character. A detectable token (i.e., a physical object) may be removably attached to the physical accessory. According to some implementations, responsive to the physical accessory being detected along with the removably attached token, a modification within the virtual space may be made to the character and/or a virtual item associated with the character. In some implementations, detection of the token alone may effectuate such a modification.

14 Claims, 5 Drawing Sheets

(58) Field of Classification Search
USPC .............................. 463/1–6, 30–33, 40–42
See application file for complete search history.

(56) References Cited

U.S. PATENT DOCUMENTS

| | | |
|---|---|---|
| 5,807,174 A | 9/1998 | Fukuhara |
| 5,853,327 A | 12/1998 | Gilboa ............................ 463/39 |
| 5,855,483 A | 1/1999 | Collins et al. ................. 434/322 |
| 6,290,565 B1 | 9/2001 | Galyean III |
| 6,354,947 B1 | 3/2002 | Dobrusskin et al. ............ 463/43 |
| 6,361,396 B1 | 3/2002 | Snyder et al. ................. 446/397 |
| 6,364,735 B1 | 4/2002 | Bristow et al. ................ 446/397 |
| 6,650,870 B2 | 11/2003 | White et al. ..................... 455/41 |
| 6,735,324 B1 | 5/2004 | McKinley et al. ............ 382/100 |
| 6,761,637 B2 | 7/2004 | Weston et al. ................... 463/42 |
| 6,773,325 B1 | 8/2004 | Mawle et al. ................. 446/175 |
| 6,835,131 B1 | 12/2004 | White et al. ....................... 463/1 |
| 6,877,096 B1 | 4/2005 | Chung et al. .................. 713/185 |
| 6,967,566 B2 | 11/2005 | Weston et al. ............. 340/323 R |
| 7,001,276 B2 | 2/2006 | Shinoda ........................... 463/25 |
| 7,066,781 B2 | 6/2006 | Weston .......................... 446/268 |
| 7,081,033 B1 | 7/2006 | Mawle et al. ................. 446/175 |
| 7,244,183 B1 | 7/2007 | England ........................... 463/48 |
| 7,297,063 B2 | 11/2007 | Fujisawa et al. ................ 463/43 |
| D559,327 S | 1/2008 | Luk et al. ...................... D21/332 |
| 7,338,377 B2 | 3/2008 | Shinoda ........................... 463/47 |
| 7,426,642 B2 | 9/2008 | Aupperle et al. .............. 713/185 |
| 7,488,231 B2 | 2/2009 | Weston .......................... 446/175 |
| 7,502,759 B2 | 3/2009 | Hannigan et al. ................ 705/51 |
| 7,534,157 B2 | 5/2009 | Ganz ............................. 446/175 |
| 7,559,834 B1 | 7/2009 | York |
| 7,636,783 B2 | 12/2009 | Heutchy et al. ............... 709/227 |
| 7,677,948 B2 | 3/2010 | Ganz ............................. 446/175 |
| D620,256 S | 7/2010 | Fujimura et al. .............. D3/294 |
| D620,257 S | 7/2010 | Fujimura et al. .............. D3/294 |
| 7,789,726 B2 | 9/2010 | Ganz ............................. 446/175 |
| D626,978 S | 11/2010 | Huh ............................... D15/126 |
| 7,843,334 B2 | 11/2010 | Kumagai et al. ........ 340/539.13 |
| 7,843,471 B2 | 11/2010 | Doan et al. .................... 345/633 |
| 7,846,004 B2 | 12/2010 | Ganz ............................. 446/175 |
| 7,883,416 B2 | 2/2011 | Dobrusskin et al. ............ 463/37 |
| 7,883,420 B2 | 2/2011 | Bradbury et al. ............... 463/43 |
| 7,886,156 B2 | 2/2011 | Franchi ......................... 713/186 |
| 7,905,779 B2 | 3/2011 | Dyke et al. ...................... 463/30 |
| 7,933,968 B1 | 4/2011 | Zimmerman .................. 709/217 |
| 8,002,605 B2 | 8/2011 | Ganz ............................. 446/175 |
| D645,910 S | 9/2011 | Foster et al. .................. D21/333 |
| 8,025,573 B2 | 9/2011 | Stenton et al. ................... 463/43 |
| 8,033,901 B2 | 10/2011 | Wood ................................. 463/1 |
| D657,426 S | 4/2012 | Gomez ........................ D21/330 |
| D666,249 S | 8/2012 | Minchella Jennings et al. ............................. D21/333 |
| 8,323,068 B2 | 12/2012 | Ganetakos et al. ........... 446/175 |
| 8,401,913 B2 | 3/2013 | Alivandi ....................... 705/26.1 |
| D680,594 S | 4/2013 | Mercier et al. ............... D21/330 |
| D687,106 S | 7/2013 | Menting ........................ D21/398 |
| 8,521,180 B2 | 8/2013 | Parish |
| 8,726,172 B1 | 5/2014 | Vignocchi et al. ............ 715/757 |
| D710,945 S | 8/2014 | Biheller et al. ............... D21/333 |
| 8,854,178 B1 | 10/2014 | Mangold |
| 8,864,589 B2 * | 10/2014 | Reiche, III ...................... 463/44 |
| 8,904,298 B2 | 12/2014 | Nelson et al. ................. 715/757 |
| 8,909,920 B2 | 12/2014 | Vignocchi et al. ............ 713/159 |
| 8,910,266 B2 | 12/2014 | Vignocchi et al. ................ 726/9 |
| 8,961,315 B1 | 2/2015 | Adogla |
| 8,972,369 B2 | 3/2015 | Vignocchi |
| 8,986,115 B2 | 3/2015 | Vignocchi |
| 9,092,114 B2 | 7/2015 | Nelson |
| 2002/0090985 A1 | 7/2002 | Tochner |
| 2003/0037075 A1 | 2/2003 | Hannigan et al. ............. 707/500 |
| 2004/0002369 A1 | 1/2004 | Walker |
| 2004/0029625 A1 | 2/2004 | Annunziata ....................... 463/1 |
| 2004/0092311 A1 | 5/2004 | Weston et al. ................... 463/42 |
| 2004/0204212 A1 | 10/2004 | Sato |
| 2004/0266505 A1 | 12/2004 | Keam et al. ........................ 463/1 |
| 2005/0245302 A1 | 11/2005 | Bathiche et al. .................. 463/1 |
| 2006/0009287 A1 | 1/2006 | Engelfriet ........................ 463/35 |
| 2006/0047825 A1 | 3/2006 | Steenstra |
| 2006/0063575 A1 * | 3/2006 | Gatto ..................... A63F 13/00 463/1 |
| 2006/0094501 A1 | 5/2006 | O'Leary et al. ................. 463/30 |
| 2006/0148545 A1 | 7/2006 | Rhyne |
| 2006/0154711 A1 | 7/2006 | Ellis |
| 2006/0234601 A1 | 10/2006 | Weston |
| 2007/0015588 A1 | 1/2007 | Matsumoto et al. ............ 463/43 |
| 2007/0087798 A1 | 4/2007 | McGucken |
| 2007/0087831 A1 | 4/2007 | Van Luchene |
| 2007/0087839 A1 | 4/2007 | Bradbury et al. ............... 463/43 |
| 2007/0197297 A1 | 8/2007 | Witchey .......................... 463/42 |
| 2007/0207860 A1 | 9/2007 | Yamauchi |
| 2007/0211047 A1 | 9/2007 | Doan et al. .................... 345/419 |
| 2007/0218965 A1 | 9/2007 | Tilston |
| 2008/0085773 A1 | 4/2008 | Wood .............................. 463/43 |
| 2008/0104018 A1 | 5/2008 | Xia |
| 2008/0161113 A1 | 7/2008 | Hansen et al. ................... 463/42 |
| 2008/0280684 A1 | 11/2008 | McBride et al. ................ 463/42 |
| 2008/0300053 A1 | 12/2008 | Muller ............................. 463/31 |
| 2009/0002377 A1 | 1/2009 | Lee et al. ....................... 345/473 |
| 2009/0005167 A1 | 1/2009 | Arrasvuori |
| 2009/0023487 A1 | 1/2009 | Gilson et al. ................... 463/11 |
| 2009/0053970 A1 | 2/2009 | Borge ............................ 446/268 |
| 2009/0137323 A1 | 5/2009 | Fiegener et al. ................ 463/43 |
| 2009/0149232 A1 | 6/2009 | Gosztyla |
| 2009/0170585 A1 | 7/2009 | Yang |
| 2009/0197658 A1 | 8/2009 | Polchin ............................. 463/9 |
| 2009/0203446 A1 | 8/2009 | Bradbury et al. ............... 463/40 |
| 2009/0291764 A1 | 11/2009 | Kirkman et al. ................ 463/43 |
| 2009/0307611 A1 | 12/2009 | Riley |
| 2010/0023492 A1 | 1/2010 | Lucas ............................... 707/3 |
| 2010/0075761 A1 | 3/2010 | Lord |
| 2010/0114614 A1 | 5/2010 | Sharpe |
| 2010/0144429 A1 | 6/2010 | Ryan |
| 2010/0151940 A1 | 6/2010 | Borge ............................. 463/29 |
| 2010/0292008 A1 | 11/2010 | Matsumura |
| 2011/0045913 A1 | 2/2011 | Walker et al. ................... 463/42 |
| 2011/0107239 A1 | 5/2011 | Adoni et al. ................... 715/757 |
| 2011/0159963 A1 | 6/2011 | Link |
| 2011/0165939 A1 | 7/2011 | Borst |
| 2011/0231781 A1 | 9/2011 | Betzler et al. ................. 715/757 |
| 2011/0250954 A1 | 10/2011 | Braund ............................ 463/29 |
| 2011/0263322 A1 | 10/2011 | Van Luchene .................. 463/29 |
| 2011/0263332 A1 | 10/2011 | Mizrachi ......................... 463/42 |
| 2011/0264741 A1 | 10/2011 | Ganetakos |
| 2011/0270751 A1 | 11/2011 | Csinger |
| 2011/0288914 A1 | 11/2011 | Guthrie ........................ 705/14.4 |
| 2011/0294574 A1 | 12/2011 | Yamada et al. ................. 463/30 |
| 2012/0015748 A1 | 1/2012 | Osada ............................. 463/43 |
| 2012/0019480 A1 | 1/2012 | Cannon |
| 2012/0064968 A1 | 3/2012 | Youm et al. .................... 463/29 |
| 2012/0077599 A1 | 3/2012 | VanLuchene |
| 2012/0142429 A1 | 6/2012 | Muller ............................. 463/42 |
| 2012/0172131 A1 | 7/2012 | Boswell et al. ................. 463/42 |
| 2012/0238362 A1 | 9/2012 | Janis et al. ...................... 463/31 |
| 2012/0252570 A1 | 10/2012 | Kwant |
| 2012/0295702 A1 | 11/2012 | Otero et al. ..................... 463/31 |
| 2012/0295703 A1 | 11/2012 | Reiche et al. ................... 763/31 |
| 2012/0295704 A1 | 11/2012 | Reiche et al. ................... 463/31 |
| 2012/0302356 A1 | 11/2012 | Annunziata .................... 463/42 |
| 2012/0311688 A1 | 12/2012 | Lemus et al. ...................... 726/8 |
| 2012/0315983 A1 | 12/2012 | Miller, IV et al. ............. 463/29 |
| 2012/0331529 A1 | 12/2012 | Ibel et al. ........................ 726/4 |
| 2013/0017891 A1 | 1/2013 | Romero |
| 2013/0040654 A1 | 2/2013 | Parish |
| 2013/0079132 A1 | 3/2013 | Archer et al. ................... 463/31 |
| 2013/0086114 A1 | 4/2013 | Wilson |
| 2013/0290137 A1 | 10/2013 | Olomskiy .................. 405/26.41 |
| 2013/0290147 A1 | 10/2013 | Chandra et al. .............. 705/27.1 |
| 2013/0296043 A1 | 11/2013 | Weinshanker et al. .......... 463/30 |
| 2014/0066209 A1 | 3/2014 | Annambhotla ................. 463/42 |
| 2014/0176534 A1 | 6/2014 | Vignocchi et al. ............ 345/419 |
| 2014/0179418 A1 | 6/2014 | Vignocchi et al. .............. 463/29 |
| 2014/0179443 A1 | 6/2014 | Vignocchi |
| 2014/0179444 A1 | 6/2014 | Vignocchi et al. .............. 463/43 |
| 2014/0181062 A1 | 6/2014 | Vignocchi et al. ............ 707/705 |

(56) References Cited

U.S. PATENT DOCUMENTS

| | | | |
|---|---|---|---|
| 2014/0181507 A1 | 6/2014 | Vignocchi et al. | 713/159 |
| 2014/0181706 A1 | 6/2014 | Vignocchi | 715/764 |
| 2014/0181820 A1 | 6/2014 | Vignocchi et al. | 718/100 |
| 2014/0181994 A1 | 6/2014 | Vignocchi et al. | 726/28 |
| 2014/0223534 A1 | 8/2014 | Vignocchi et al. | 726/9 |
| 2014/0304624 A1 | 10/2014 | Nelson et al. | 715/757 |
| 2015/0033154 A1 | 1/2015 | Nelson et al. | 715/757 |
| 2015/0033317 A1 | 1/2015 | Vignocchi et al. | 726/9 |
| 2015/0134658 A1 | 5/2015 | Vignocchi | |
| 2015/0294508 A1 | 10/2015 | Nelson | |

FOREIGN PATENT DOCUMENTS

| | | |
|---|---|---|
| GB | 2 365 364 | 2/2002 |
| WO | WO 01/69572 | 9/2001 |
| WO | WO 01/69830 | 9/2001 |
| WO | WO 03/043709 | 5/2003 |
| WO | 2007101785 | 9/2007 |
| WO | WO 2007/101785 | 9/2007 |

OTHER PUBLICATIONS

U.S. Appl. No. 60/288,272, filed May 2, 2001 in the name of Ravi K. Sharma et al., 31 pages.

U.S. Appl. No. 60/297,229, filed Jun. 7, 2001 in the name of Brett T. Hannigan et al., 46 pages.

U.S. Appl. No. 60/335,908, filed Nov. 14, 2001 in the name of Stephen C. Beck, 120 pages.

U.S. Appl. No. 60/355,856, filed Feb. 10, 2002 in the name of Brett T. Hannigan et al., 53 pages.

Varney, Allen et al., "Paranoia XP", Mongoose Publishing, Dec. 31, 2004, ISBN: 978-1-904854-26-5, retrieved from the Internet: URL:http://fc09.deviantart.net/fs71/f/2012/316/e/6/paranoia_player_section_by_atta_crossroads-d4zxv52.pdf, retrieved Apr. 16, 2014, 110 pages.

Diablo III, Wikipedia.org, online, accessed via the Internet, accessed Jun. 26, 2014, URL: <http://en.wikipedia.org/wiki/Diablo_III>, 25 pages.

Stash, Diablowiki.net, online, accessed via the Internet, accessed Jun. 26, 2014, URL: <http://www.diablowiki.net/Stash>, 7 pages.

Gear Sets, Diablowiki.net, online, accessed via the Internet, accessed Jun. 26, 2014, URL: <http://www.diablowiki.net/Gear_sets>, 8 pages.

Weapons, Diablowiki.net, online, accessed via the Internet, accessed Jun. 26, 2014, URL: <http://www.diablowiki.net/Weapons>, 7 pages.

Fundamentals, Battle.net, online, accessed via the Internet, accessed Jun. 26, 2014, URL: <http://us.battle.net/d3/en/game/guide/gameplay/fundamentals>, 13 pages.

Inventory, Battlet.net, online, accessed via the Internet, accessed Jun. 26, 2014, URL: <http://us.battle.net/d3/en/game/guide/items/inventory>, 9 pages.

Toy Story 3: The Video Game, Wikipedia.org, online, accessed via the Internet, accessed Jun. 26, 2014, URL: <http:/en.wikipedia.org/wiki/Toy_Story_3:_The_Video_Game>, 10 pages.

Toy Story 3 Toy Box Mode Demo, Youtube.com, online, May 8, 2010, accessed via the Internet, accessed Jun. 26, 2014, URL: <http://www.youtube.com/watch?v=Do84qnpfUvQ>, 2 pages.

Crecente, Brian, "Diving Into Toy Story 3's Toy Box", Kotaku.com, online, May 20, 2010, accessed via the Internet, accessed Jun. 26, 2014, URL: <http://kotaku.com/5543513/diving-into-toy-story-3s-toy-box>, 4 pages.

Whitehead, Dan, "Toy Story 3 Page 2", Eurogamer.net, online, Jul. 14, 2010, accessed via the Internet, accessed Jun. 26, 2014, URL: <http://www.eurogamer.net/articles/toy-story-3-review?page=2>, 2 pages.

Barnett, Emma; "New App Automates Foursquare 'Check-Ins'", The Telegraph, Aug. 3, 2010, as published at http://www.telegraph.co.uk/technology/news/7924803/New-app-automates-four-square-check-ins.html. (4 pages).

Lapenna, Joe; "Check in With Google Latitude," Google Mobile Blog, Feb. 1, 2011, as published at http://www.googlemobile.blogspot.com/2011/02/check-in-with-google-latitude.html. (12 pages).

Paul et al., "Adaptive Storytelling and Story Repair in a Dynamic Environment" 2011, Springer-Verlag Berlin Heidelberg, pp. 128-139.

[Guide] Item Drops That Starts Quest [LvL 1-85 Zones]. Eu.battle.net. Online. Dec. 31, 2010. Accessed via the Internet. Accessed Nov. 13, 2014. <URL:http://eu.battle.net/wow/en/forum/topic/1415204550>, 18 pages.

Blood Elf Plans. Eu.battle.net. Online. Accessed via the Internet. Accessed Nov. 13, 2014. <URL:http://eu.battle.net/wow/en/item/24414>, 2 pages.

"The Legend of Zelda: Phantom Hourglass—Instruction Booklet", Jan. 1, 2007, XP002582478, retrieved from the Internet: URL:http://www.nintendo.com/consumer/gameslist/manuals/DS_Zelda_Phantom_Hourglass.pdf [retrieved on Jun. 1, 2010], pp. 1-18.

Anonymous, "Auction House/Barter House", Path of Exile—Forum, Retrieved from the Internet: URL: https://www.pathofexile.com/forum/view-thread/29205 [retrieved on Oct. 13, 2015], Apr. 25, 2012 (Apr. 25, 2012), XP055220590, 9 pages.

Anonymous, "Trade", WoWWiki—Your Guide to the World of Warcraft and Its Universe, Retrieved from the Interent: URL: http://wowwiki.wikia.com/wiki/Trade [retrieved on Oct. 13, 2015], Dec. 18, 2012 (Dec. 18, 2012), XP055220546, 3 pages.

European Examination Report issued in European Patent Application No. 13199483.2, dated Nov. 10, 2015, 7 pages.

"Super Mario Galaxy—Super Mario Wiki, the Mario Encyclopedia", Dec. 20, 2012, URL:http://www.mariowiki.com/index/php?title=Super_Mario_Galaxy&oldid=1378528 [retrieved on Jun. 22, 2016].

* cited by examiner

APPARATUS, SYSTEM, AND METHOD FOR EFFECTUATING MODIFICATIONS TO A VIRTUAL SPACE RESPONSIVE TO TOKEN DETECTION

FIELD OF THE DISCLOSURE

This disclosure relates to an apparatus, system, and method for effectuating modifications to a virtual space responsive to token detection.

BACKGROUND

Conventionally, modifications to characters and/or virtual items within a virtual space, or to the virtual space itself, may be limited to modifications made in response to in-space actions. For example, a user may select from an in-space menu providing available modification options. As another example, modifications may be made in response to actions performed by a character in a virtual space.

SUMMARY

One aspect of the disclosure relates to a system configured to effectuate modifications to characters and/or virtual items within a virtual space, or to the virtual space itself, responsive to token detection, in accordance with one or more implementations. The system may include one or more of a token, a physical accessory, a token reader, and/or other components. Exemplary implementations may facilitate modifications to characters and/or virtual items within a virtual space, or to the virtual space itself, made responsive to detection of a token. In some implementations, a physical accessory may depict a character in the virtual space. By way of non-limiting example, the physical accessory may include a toy figurine resembling the character. A detectable token (i.e., a physical object) may be removably attached to the physical accessory. According to some implementations, responsive to the physical accessory being detected along with the removably attached token, a modification within the virtual space may be made to the character and/or a virtual item associated with the character. In some implementations, detection of the token alone may effectuate such a modification.

The token may be a standalone physical object. Examples of the token may include one or more of a toy figurine, a toy accessory, a disk, a coin, a card, and/or other form factors suitable to be tokens as described herein. The token may be configured to depict a given character and/or a given virtual item.

The token may be configured to be detectable by a token reader. Detection of the token may effectuate a modification to a character within the virtual space. The character may be a user-controlled character or a non-user-controlled character. The modification to the character may include a modification to one or more of a behavior of the character, an ability of the character, an appearance of the character, a relationship of the character, and/or other modifications associated with the character. By way of non-limiting example, a modification to a behavior of the character may include a modification to how the character acts when idle. A modification to an ability of the character may include a modification to a speed at which the character can run. A modification to an ability of the character may include addition abilities (e.g., flying). A modification to an appearance of the character may include a change to apparel worn by the character. A modification to a relationship of the character may include becoming friends with another character.

Detection of the token may effectuate a modification to a virtual item within the virtual space. The modification to the virtual item may include a modification to one or more of a function of the virtual item, an effectiveness of the virtual item, an appearance of the virtual item, and/or other modifications associated with the virtual item. By way of non-limiting example, a modification to a function of the virtual item may include extending a range of shots fired by the virtual item. A modification to a function of the virtual item may include additional functions (e.g., shooting laser beams in addition to normal shots). A modification to an effectiveness of the virtual item may include decreasing the number of shots from the virtual item required to defeat a foe. A modification to the appearance of the virtual item may include a change to the color or size of the virtual item.

Detection of the token may effectuate a modification to one or more aspects of the virtual space. The one or more aspects of the virtual space may include one or more of objectives associated with the virtual space, an environment of the virtual space, a theme of the virtual space, and/or other aspects of the virtual space. A given objective being a purpose or goal that efforts or actions within the virtual space are intended to attain or accomplish. By way of non-limiting example, a modification to an objective may include a modification to a set of actions that must be performed by a user character in order to advance to a next level of gameplay in the virtual space.

The environment of the virtual space may be an aggregate of surroundings and conditions of the virtual space. By way on non-limiting example, a modification to the surroundings of the virtual space may include a modification to one or more of the appearance of the virtual space, a color scheme of the virtual space, a sound and/or soundtrack associated with the virtual space, and/or other aspects of the surroundings of the virtual space. A modification to the conditions of the virtual space may include a modification to one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a plurality of characters associated with a given theme. By way of non-limiting example, where the character is Captain Jack Sparrow, the theme may relate to Pirates of the Caribbean. A modification to the theme of the virtual space may include a modification to one or more attributes of the theme of the virtual space. Examples of such attributes may include one or more of objects, designs, symbols, color schemes, music, and/or other attributes that identify the theme of the virtual space.

The token may have an overall shape. By way of non-limiting example, the overall shape may include a cube, a sphere, a card, statuette, and/or other overall shapes.

In some implementations, an appearance of the token may be different from the appearance of other tokens configured to be detected to effectuate other modifications within the virtual space. The other modifications may be different from a modification effectuated responsive to detection of the token. In some implementations, the other tokens may vary in appearance from the token in one or more of overall shape, color, imagery, form, and/or other manners affecting appearance.

According to some implementations, detection of the token in combination with detection of one or more other tokens may effectuate one or more of (1) a modification to one or both of a character and/or a virtual item or (2) a modification to one or more aspects of the virtual space. In some implementations, detection of both a first token associated with a first character and a second token associated with a second theme may effectuate a modification to the first character based on the second theme.

The physical accessory may be a standalone physical object. Examples of physical accessory may include one or more of a toy figurine, a toy accessory, a disk, a coin, a card, and/or other form factors suitable to be a physical accessory as described herein. The physical accessory may be configured to depict one or both of a character and/or a virtual item. In some implementations, the physical accessory may itself be a token. For example, the physical accessory may be detectable.

The token may be configured to be removably attached to the physical accessory. In some implementations, the token must be attached to the physical accessory for the modification to one or more of a character, a virtual item, and/or one or more aspects of the virtual space to be effectuated. By way of non-limiting illustration, the token may be removably attached to a bottom surface of the physical accessory. Responsive to the token and the physical accessory being detected together, a modification may be made to one or both of (1) the character depicted by the physical accessory or (2) a virtual item associated with the character depicted by the physical accessory.

The token reader may be configured to detect the token. The token reader may be configured to provide signals associated with individual tokens. For example, a given signal associated with a given token may convey information associated with the given token. In some implementations, the token reader may be configured to provide a first signal responsive to one or more of (1) a first token abutting a portion of the token reader, (2) the first token being disposed in a proximity of the token reader, and/or other actions configured to facilitate detection of the first token. In some implementations, the token may be configured to be removably attached to a surface of the token reader.

According to some implementations, the token reader may be a peripheral device configured to be communicatively coupled with one or more components of the system. In some implementations, the token reader may be integrated so as to form a singular device with a component of the system.

The system may include one or more virtual space platforms. The virtual space platform(s) may be configured to execute one or more computer program modules. The computer program modules may include one or more of a user module, a space module, a token detection module, a virtual space modification module, a virtual item repository module, and/or other modules. The user module may be configured to access and/or manage one or more user profiles and/or user information associated with users of the system. The space module may be configured to implement the instance of the virtual space executed by the computer modules to determine views of the virtual space.

The token detection module may be configured to detect tokens based on signals received from the token reader. Detecting the token may include receiving a signal conveying information associated with the token. Such information may be utilized to identify the token, a character associated with the token, a virtual item associated with the token, and/or other information associated with the token.

The virtual space modification module may be configured to effectuate a modification to one or both of a first character or a first virtual item within the virtual space responsive to detection of a first token. As described further herein, the modification to the first character may include a modification to one or more of a behavior of the first character, an ability of the first character, an appearance of the first character, a relationship of the first character, and/or other modifications associated with the first character. As described further herein, the modification to the first virtual item may include a modification to one or more of a function of the first virtual item, an effectiveness of the first virtual item, an appearance of the first virtual item, and/or other modifications associated with the first virtual item.

The virtual space modification module may be configured to effectuate a modification to one or more aspects of the virtual space responsive to detection of the first token. As described further herein, the one or more aspects of the virtual space may include one or more of objectives associated with the virtual space, an environment of the virtual space, a theme of the virtual space, and/or other aspects of the virtual space.

The virtual item repository module may be configured to provide a virtual item repository within the virtual space. The virtual item repository may be configured to facilitate and/or provide access by a plurality of characters to a plurality of virtual items. The plurality of virtual items may include the first virtual item. Where a plurality of characters in the virtual space include the first character and a second character, the first virtual item may be associated with the first character and the first virtual item may be accessible to the second character via the virtual item repository.

In some implementations, the virtual item repository may be visually represented at a location within the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Exemplary implementations may facilitate modifications to characters and/or virtual items within a virtual space, or to the virtual space itself, made responsive to detection of a token. In some implementations, a physical accessory may depict a character in the virtual space. By way of non-limiting example, the physical accessory may include a toy figurine resembling the character. A detectable token (i.e., a physical object) may be removably attached to the physical accessory. According to some implementations, responsive to the physical accessory being detected along with the removably attached token, a modification within the virtual space may be made to the character and/or a virtual item associated with the character. In some implementations, detection of the token alone may effectuate such a modification.

Figure 1A:
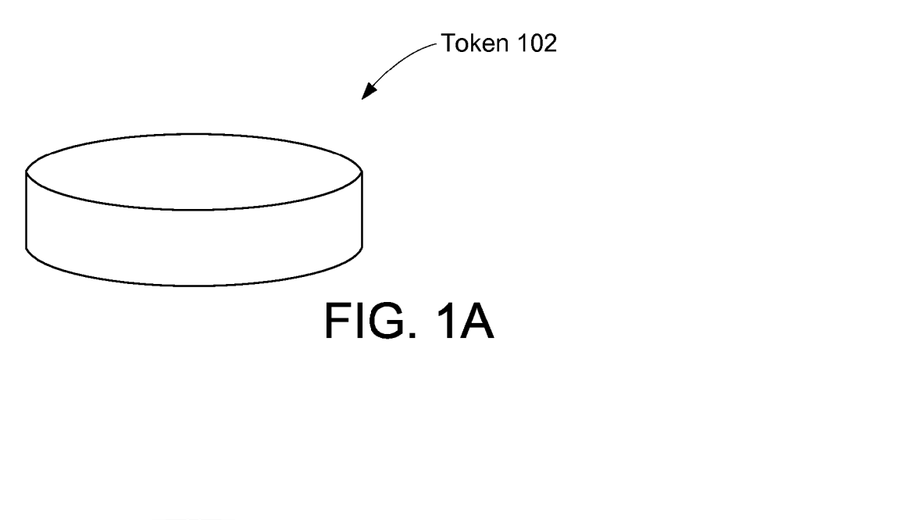
FIG. 1A illustrates a token configured to be detected to effectuate modifications to characters and/or virtual items within a virtual space, or to the virtual space itself, in accordance with one or more implementations.
Figure 1B:
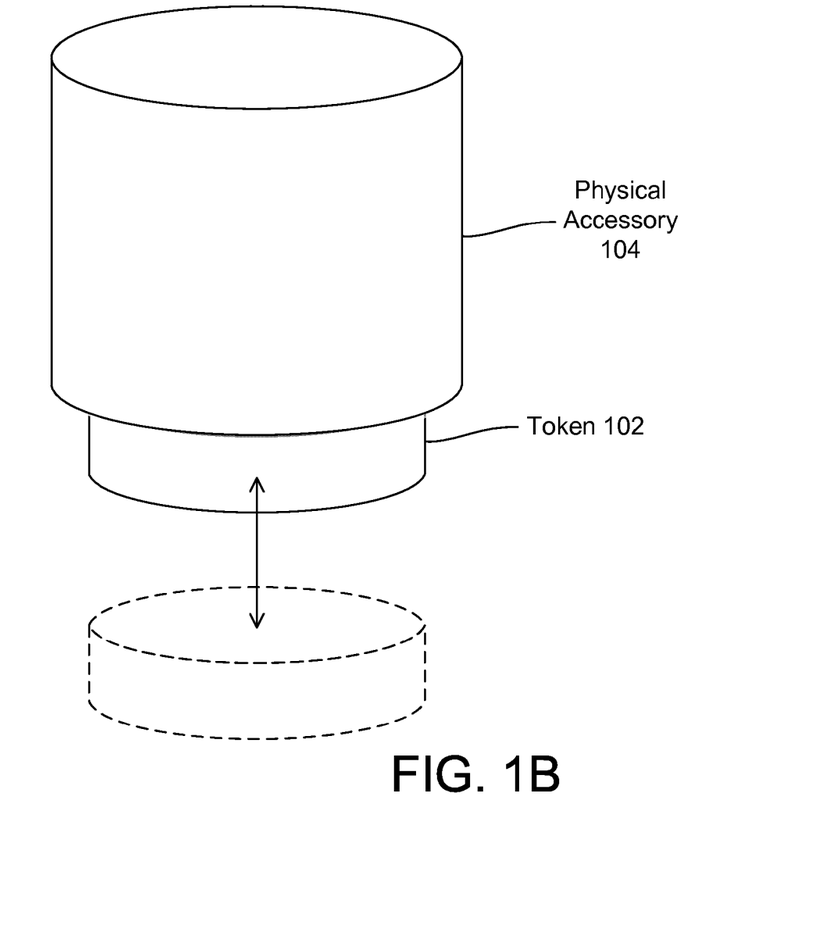
FIG. 1B illustrates a token with a physical accessory, in accordance with one or more implementations.
Figure 1C:
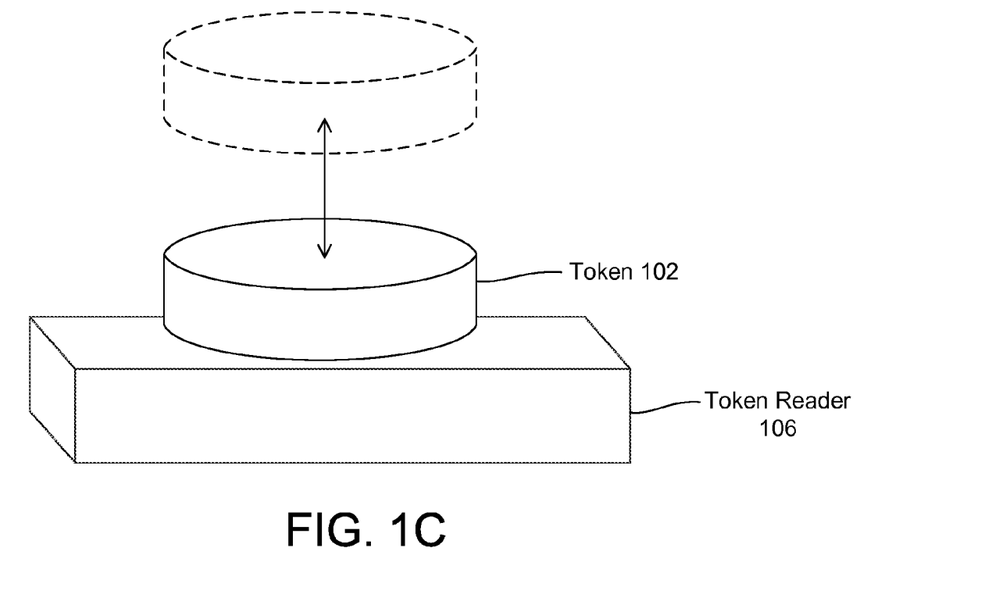
FIG. 1C illustrates a token with a token reader, in accordance with one or more implementations.

FIGS. 1A-1C illustrate various apparatuses configured to facilitate effectuating modifications to characters and/or virtual items within a virtual space, or to the virtual space itself, responsive to token detection, in accordance with one or more implementations. More specifically, FIG. 1A illustrates a token 102 configured to be detected to effectuate modifications to characters and/or virtual items within a virtual space, or to the virtual space itself, in accordance with one or more implementations; FIG. 1B illustrates token 102 with a physical accessory 104, in accordance with one or more implementations; and FIG. 1C illustrates token 102 with a token reader 106, in accordance with one or more implementations.

The token 102 may be a standalone physical object. Examples of token 102 may include one or more of a toy figurine, a toy accessory, a disk, a coin, a card, and/or other form factors suitable to be tokens as described herein. The token 102 may be configured to depict a given character and/or a given virtual item. By way of non-limiting example, the given character may be Captain Jack Sparrow, the fictional character and protagonist of the Pirates of the Caribbean film series. The given virtual item may be an accessory associated with Captain Jack Sparrow, such as a sword. The token 102 may be a toy figurine embodying the appearance of Captain Jack Sparrow and/or the sword. The token 102 may include an image of Captain Jack Sparrow and/or the sword. The token 102 may include an emblem associated with Captain Jack Sparrow and/or the sword.

The token 102 may be configured to be detectable by token reader 106. In some implementations, detection of token 102 may be based on a shape of a portion of token 102 and/or an overall shape of token 102. In some implementations, token 102 may be detectable based on a signal conveying information associated with token 102. Detection of token 102 may be facilitated by electronics embedded within or otherwise included in token 102. For example, token 102 may include a radio-frequency identification (RFID) chip configured to emit radio-frequency electromagnetic fields responsive to token 102 being disposed in a proximity of token reader 106. As another example, token 102 may include an integrated circuit configured to transfer information associated with token 102 responsive to token 102 being placed in contact with a portion of token reader 106.

According to some implementations, virtual space content associated with one or more of a character, a virtual item, the virtual space, a modification to the character, a modification to the virtual item, a modification to the virtual space, and/or other virtual space content may be stored at a location other than token 102. That is, token 102 may not store virtual space content. The token 102 may store information used to detect token 102. The token 102 may not store information other than what may be used to detect the given token. Virtual space content may include information used to affect views and/or gameplay of the virtual space. Such virtual space content may be stored by virtual space platform(s) and/or by one or more other components of the system described in connection with FIG. 2.

Detection of token 102 may effectuate a modification to a character within the virtual space. The character may be a user-controlled character or a non-user-controlled character. The modification to the character may include a modification to one or more of a behavior of the character, an ability of the character, an appearance of the character, a relationship of the character, and/or other modifications associated with the character. By way of non-limiting example, a modification to a behavior of the character may include a modification to how the character acts when idle. A modification to an ability of the character may include a modification to a speed at which the character can run. A modification to an ability of the character may include addition abilities (e.g., flying). A modification to an appearance of the character may include a change to apparel worn by the character. A modification to a relationship of the character may include becoming friends with another character.

Detection of token 102 may effectuate a modification to a virtual item within the virtual space. The modification to the virtual item may include a modification to one or more of a function of the virtual item, an effectiveness of the virtual item, an appearance of the virtual item, and/or other modifications associated with the virtual item. By way of non-limiting example, a modification to a function of the virtual item may include extending a range of shots fired by the virtual item. A modification to a function of the virtual item may include additional functions (e.g., shooting laser beams in addition to normal shots). A modification to an effectiveness of the virtual item may include decreasing the number of shots from the virtual item required to defeat a foe. A modification to the appearance of the virtual item may include a change to the color or size of the virtual item.

Detection of token 102 may effectuate a modification to one or more aspects of the virtual space. The one or more aspects of the virtual space may include one or more of objectives associated with the virtual space, an environment of the virtual space, a theme of the virtual space, and/or other aspects of the virtual space. A given objective being a purpose or goal that efforts or actions within the virtual space are intended to attain or accomplish. By way of non-limiting example, a modification to an objective may include a modification to a set of actions that must be performed by a user character in order to advance to a next level of gameplay in the virtual space.

The environment of the virtual space may be an aggregate of surroundings and conditions of the virtual space. By way on non-limiting example, a modification to the surroundings of the virtual space may include a modification to one or more of the appearance of the virtual space, a color scheme of the virtual space, a sound and/or soundtrack associated with the virtual space, and/or other aspects of the surroundings of the virtual space. A modification to the conditions of the virtual space may include a modification to one or more of laws of nature (e.g., gravity) of the virtual space, weather depicted in the virtual space, and/or other aspects of the conditions of the virtual space. Modifying the environment may include modifying one or both of the surroundings or the conditions of the virtual space.

The theme of the virtual space may be a unifying subject associated with the virtual space. A given character may be one of a plurality of characters associated with a given theme. By way of non-limiting example, where the character is Captain Jack Sparrow, the theme may relate to Pirates of the Caribbean. A modification to the theme of the virtual space may include a modification to one or more attributes of the theme of the virtual space. Examples of such attributes may include one or more of objects, designs, symbols, color schemes, music, and/or other attributes that identify the theme of the virtual space.

The token 102 may have an overall shape. As depicted in FIG. 1, token 102 may have an overall shape of a disk. The depiction of token 102 in FIG. 1 is not intended to be limiting as a given token (e.g., token 102) may have one or more other overall shapes. By way of non-limiting example, the overall shape may include a cube, a sphere, a card, statuette, and/or other overall shapes.

In some implementations, an appearance of token 102 may be different from the appearance of other tokens configured to be detected to effectuate other modifications within the virtual space. The other modifications may be different from a modification effectuated responsive to detection of token 102. In some implementations, the other tokens may vary in appearance from token 102 in one or more of overall shape, color, imagery, form, and/or other manners affecting appearance.

According to some implementations, detection of token 102 in combination with detection of one or more other tokens may effectuate one or more of (1) a modification to one or both of a character and/or a virtual item or (2) a modification to one or more aspects of the virtual space. In some implementations, detection of both a first token associated with a first character and a second token associated with a second theme may effectuate a modification to the first character based on the second theme. By way of non-limiting example, where the first character is Captain Jack Sparrow and the second theme relates to the Toy Story film series, the first character may be modified such that Captain Jack Sparrow sings the theme song of Toy Story.

The physical accessory 104 may be a standalone physical object. Examples of physical accessory 104 may include one or more of a toy figurine, a toy accessory, a disk, a coin, a card, and/or other form factors suitable to be a physical accessory as described herein. The physical accessory 104 may be configured to depict one or both of a character and/or a virtual item. By way of non-limiting example, a given character may be Buzz Lightyear, the fictional character and deuteragonist of the Toy Story film series. A given virtual item may be the handheld "Blaster" used by Buzz Lightyear in the Toy Story film series.

In some implementations, physical accessory 104 may itself be a token that is the same as or similar to token 102. For example, physical accessory 104 may be detectable.

The token 102 may be configured to be removably attached to physical accessory 104. In some implementations, token 102 must be attached to physical accessory 104 for the modification to one or more of a character, a virtual item, and/or one or more aspects of the virtual space to be effectuated. By way of non-limiting illustration, token 102 may be removably attached to a bottom surface of physical accessory 104. Responsive to token 102 and physical accessory 104 being detected together, a modification may be made to one or both of (1) the character depicted by physical accessory 104 or (2) a virtual item associated with the character depicted by physical accessory 104. As another example, where physical accessory 104 depicts Captain Jack Sparrow and token 102 depicts the Blaster of Buzz Lightyear, detection of token 102 and physical accessory 104 may effectuate a modification of Captain Jack Sparrow's sword such that the sword takes on some characteristics of the Blaster (e.g., shooting laser beams).

The token reader 106 may be configured to detect token 102. The token reader 106 may be configured to provide signals associated with individual tokens (e.g., token 102). For example, a given signal associated with a given token may convey information associated with the given token. In some implementations, token reader 106 may be configured to provide a first signal responsive to one or more of (1) a first token abutting a portion of the token reader, (2) the first token being disposed in a proximity of the token reader, and/or other actions configured to facilitate detection of the first token. In some implementations, token 102 may be configured to be removably attached to a surface of token reader 106.

According to some implementations, token reader 106 may be a peripheral device configured to be communicatively coupled with one or more components of the system described in connection with FIG. 2. In some implementations, token reader 106 may be integrated so as to form a singular device with a component of the system described in connection with FIG. 2.

Figure 2:
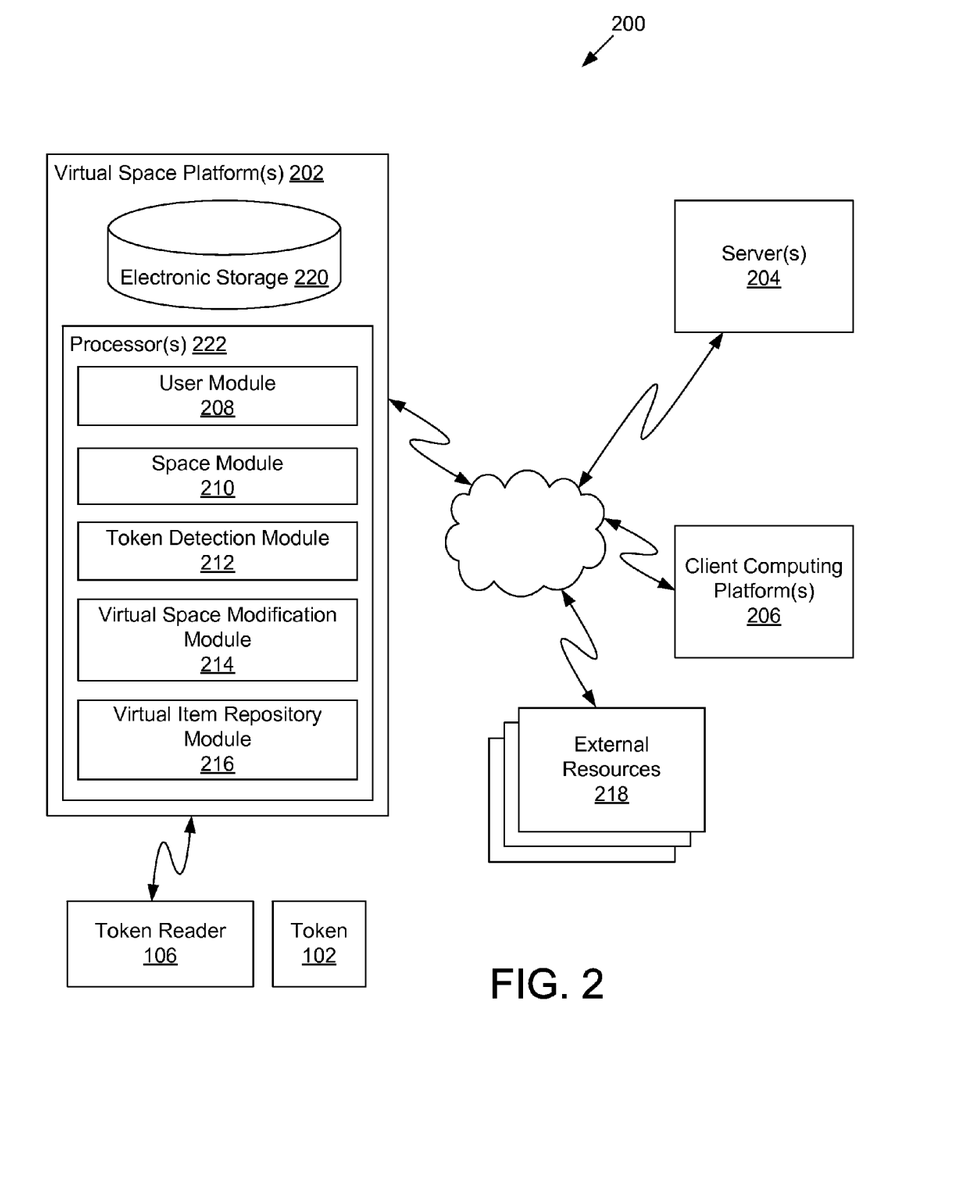
FIG. 2 illustrates a system configured to effectuate modifications to characters and/or virtual items within a virtual space, or to the virtual space itself, responsive to token detection, in accordance with one or more implementations.

FIG. 2 illustrates a system configured to effectuate modifications to characters and/or virtual items within a virtual space, or to the virtual space itself, responsive to token detection, in accordance with one or more implementations. The system 200 may include one or more virtual space platforms 202. In some implementations, virtual space platform(s) 202 may be one or more servers (e.g., server(s) 204) configured to communicate with one or more client computing platform (e.g., client computing platforms 206) according to a client/server architecture. According to some implementations, virtual space platform(s) 202 may be one or more client computing platforms (e.g., client computing platforms 206). In some implementations, virtual space platform(s) 202 may communicate with other virtual space platform(s) 202 according to a peer-to-peer architecture. The users may access system 200 and/or the virtual space via the virtual space platform(s) 202 and/or client computing platform(s) 206.

The virtual space platform(s) 202 may be configured to execute one or more computer program modules. The computer program modules may include one or more of a user module 208, a space module 210, a token detection module 212, a virtual space modification module 214, a virtual item repository module 216, and/or other modules.

The user module 208 may be configured to access and/or manage one or more user profiles and/or user information associated with users of system 200. The one or more user profiles and/or user information may include information stored by virtual space platform(s) 202 and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 210 may be configured to implement the instance of the virtual space executed by the computer modules to determine views of the virtual space. In some implementations, the views may then be communicated (e.g., via streaming, via object/position data, and/or other information) from server(s) 204 to client computing platform(s) 206 for presentation to users. The view determined and presented to a given user may correspond to a user character being controlled by the given user. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via virtual space platform(s) 202 and/or clients (e.g., client computing platform(s) 206) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 210 is not intended to be limiting. The space module 210 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 210, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform(s) 202 and/or clients (e.g., client computing platform(s) 206). The users may interact with each other through communications exchanged within the virtual space. Such communications may include one or more of textual chat, instant messages, private messages, voice communications, and/or other communications. Communications may be received and entered by the users via their respective virtual space platform(s) 202 and/or client(s) (e.g., client computing platform(s) 206). Communications may be routed to and from the appropriate users through virtual space platform(s) 202 (e.g., through space module 210).

The token detection module 212 may be configured to detect tokens (e.g., token 102) based on signals received from token reader 106. Detecting token 102 may include receiving a signal conveying information associated with token 102. Such information may be utilized to identify token 102, a character associated with token 102, a virtual item associated with token 102, and/or other information associated with token 102.

The virtual space modification module 214 may be configured to effectuate a modification to one or both of a first character or a first virtual item within the virtual space responsive to detection of a first token (e.g., token 102). As described further herein, the modification to the first character may include a modification to one or more of a behavior of the first character, an ability of the first character, an appearance of the first character, a relationship of the first character, and/or other modifications associated with the first character. As described further herein, the modification to the first virtual item may include a modification to one or more of a function of the first virtual item, an effectiveness of the first virtual item, an appearance of the first virtual item, and/or other modifications associated with the first virtual item.

The virtual space modification module 214 may be configured to effectuate a modification to one or more aspects of the virtual space responsive to detection of the first token (e.g., token 102). As described further herein, the one or more aspects of the virtual space may include one or more of objectives associated with the virtual space, an environment of the virtual space, a theme of the virtual space, and/or other aspects of the virtual space.

The virtual item repository module 216 may be configured to provide a virtual item repository within the virtual space. The virtual item repository may be configured to facilitate and/or provide access by a plurality of characters to a plurality of virtual items. The plurality of virtual items may include the first virtual item. Where a plurality of characters in the virtual space include the first character and a second character, the first virtual item may be associated with the first character and the first virtual item may be accessible to the second character via the virtual item repository.

In some implementations, the virtual item repository may be visually represented at a location within the virtual space. By way of non-limiting example, the virtual item repository may be visually represented as a toy box within the virtual space. In some implementations, a given character may be required to be located proximally with the visual representation of the virtual item repository in order to access individual ones of the plurality of virtual items. For example, the given character may be required to stand next to, enter, and/or otherwise be located proximally with the visual representation of the virtual item repository in order to access a given virtual item.

According to some implementations, individual ones of the plurality of virtual items made accessible by the virtual item repository may be accessible to a given character via an inventory associated with the given character. The inventory may be accessible via a menu and/or other interface associated with the virtual space.

Accessibility of virtual items via the virtual item repository may vary according to different implementations. In some implementations, the virtual item repository may be configured such that a given virtual item is accessed by two or more characters at a given time. In some implementations, the virtual item repository may be configured such that a given virtual item is accessed by one single character at a given time. The one single character may be required to relinquish the given virtual item in order for the given virtual item to be accessed by another character.

In some implementations, two or more components of system 200 (e.g., virtual space platform(s) 202, server(s) 204, client computing platform(s) 206, token reader 106, and/or external resources 218) may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which two or more components of system 200 may be operatively linked via some other communication media.

A given server 204 may include one or more processors configured to execute computer program modules. The computer program modules may be configured to enable an expert or user associated with the given server 204 to interface with system 200 and/or external resources 218, and/or provide other functionality attributed herein to server(s) 204.

A given client computing platform 206 may include one or more processors configured to execute computer program modules. The computer program modules may be configured to enable an expert or user associated with the given client computing platform 206 to interface with system 200 and/or external resources 218, and/or provide other functionality attributed herein to client computing platform(s) 206. By way of non-limiting example, the given client computing platform 206 may include one or more of a desktop computer, a laptop computer, a handheld computer, a NetBook, a Smartphone, a gaming console, and/or other computing platforms.

The external resources 218 may include sources of information, hosts and/or providers of virtual environments outside of system 200, external entities participating with system 200, and/or other resources. In some implementations, some or all of the functionality attributed herein to external resources 218 may be provided by resources included in system 200.

The virtual space platform(s) 202 may include electronic storage 220, one or more processors 222, and/or other components. The virtual space platform(s) 202 may include communication lines, or ports to enable the exchange of information with a network and/or other computing platforms. Illustration of virtual space platform(s) 202 in FIG. 2 is not intended to be limiting. The virtual space platform(s) 202 may include a plurality of hardware, software, and/or firmware components operating together to provide the functionality attributed herein to virtual space platform(s) 202. For example, virtual space platform(s) 202 may be implemented by a cloud of computing platforms operating together as virtual space platform(s) 202.

Electronic storage 220 may comprise electronic storage media that electronically stores information. The electronic storage media of electronic storage 220 may include one or both of system storage that is provided integrally (i.e., substantially non-removable) with virtual space platform(s) 202 and/or removable storage that is removably connectable to virtual space platform(s) 202 via, for example, a port (e.g., a USB port, a firewire port, etc.) or a drive (e.g., a disk drive, etc.). Electronic storage 220 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 220 may include one or more virtual storage resources (e.g., cloud storage, a virtual private network, and/or other virtual storage resources). Electronic storage 220 may store software algorithms, information determined by processor(s) 222, information received from one or more other components of system 200, and/or other information that enables virtual space platform(s) 202 to function as described herein.

The processor(s) 222 may be configured to provide information processing capabilities in virtual space platform(s) 202. As such, processor(s) 222 may include one or more of a digital processor, an analog processor, a digital circuit designed to process information, an analog circuit designed to process information, a state machine, and/or other mechanisms for electronically processing information. Although processor(s) 222 is shown in FIG. 2 as a single entity, this is for illustrative purposes only. In some implementations, processor(s) 222 may include a plurality of processing units. These processing units may be physically located within the same device, or processor(s) 222 may represent processing functionality of a plurality of devices operating in coordination. The processor(s) 222 may be configured to execute modules 208, 210, 212, 214, 216, and/or other modules. The processor(s) 222 may be configured to execute modules 208, 210, 212, 214, 216, and/or other modules by software; hardware; firmware; some combination of software, hardware, and/or firmware; and/or other mechanisms for configuring processing capabilities on processor(s) 222.

It should be appreciated that although modules 208, 210, 212, 214, and 216 are illustrated in FIG. 2 as being co-located within a single processing unit, in implementations in which processor(s) 222 includes multiple processing units, one or more of modules 208, 210, 212, 214, and/or 216 may be located remotely from the other modules. The description of the functionality provided by the different modules 208, 210, 212, 214, and/or 216 described herein is for illustrative purposes, and is not intended to be limiting, as any of modules 208, 210, 212, 214, and/or 216 may provide more or less functionality than is described. For example, one or more of modules 208, 210, 212, 214, and/or 216 may be eliminated, and some or all of its functionality may be provided by other ones of modules 208, 210, 212, 214, and/or 216. As another example, processor(s) 222 may be configured to execute one or more additional modules that may perform some or all of the functionality attributed below to one of modules 208, 210, 212, 214, and/or 216.

Figure 3:
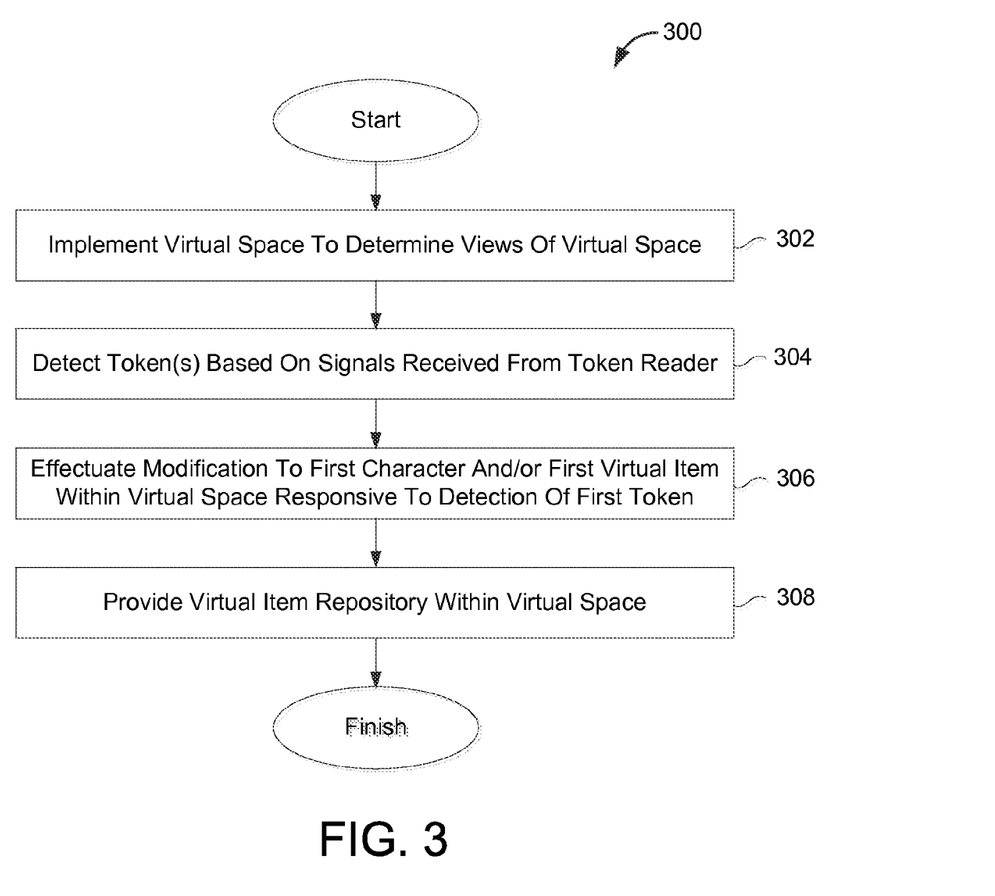
FIG. 3 illustrates a method for effectuating modifications to characters and/or virtual items within a virtual space responsive to token detection, in accordance with one or more implementations.
Figure 4:
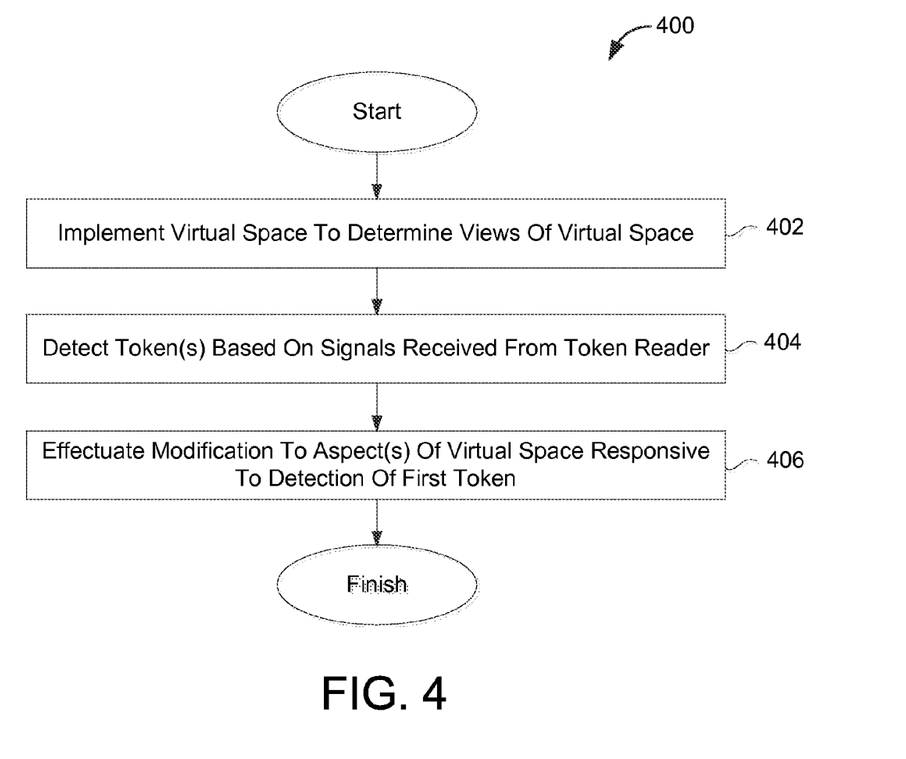
FIG. 4 illustrates a method for effectuating modifications to a virtual space responsive to token detection, in accordance with one or more implementations.

FIG. 3 illustrates a method 300 and FIG. 4 illustrates a method 400, in accordance with one or more implementations. The operations of method 300 and method 400 presented below are intended to be illustrative. In some embodiments, method 300 and/or method 400 may be accomplished with one or more additional operations not described, and/or without one or more of the operations discussed. Additionally, the order in which the operations of method 300 and/or method 400 are respectively illustrated in FIG. 3 and/or FIG. 4 and described below is not intended to be limiting.

In some embodiments, method 300 and/or method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 and/or method 400 in response to instructions stored electronically on an electronic storage medium. The one or more processing devices may include one or more devices configured through hardware, firmware, and/or software to be specifically designed for execution of one or more of the operations of method 300 and/or method 400.

The method 300, illustrated in FIG. 3, is for effectuating modifications to characters and/or virtual items within a virtual space responsive to token detection, in accordance with one or more implementations.

At an operation 302, the virtual space may be implemented to determine views of the virtual space. Operation 302 may be performed by a space module that is the same as or similar to space module 210, in accordance with one or more implementations.

At an operation 304, one or more tokens may be detected based on signals received from a token reader (e.g., token reader 106). Operation 304 may be performed by a token detection module that is the same as or similar to token detection module 212, in accordance with one or more implementations.

At an operation 306, a modification may be effectuated to one or both of a first character or a first virtual item within the virtual space responsive to detection of a first token. Operation 306 may be performed by a virtual space modification module that is the same as or similar to virtual space modification module 214, in accordance with one or more implementations.

At an operation 308, a virtual item repository may be provided within the virtual space. The virtual item repository may be configured to facilitate access by characters to the unlocked virtual items. Operation 308 may be performed by a virtual item repository module that is the same as or similar to virtual item repository module 216, in accordance with one or more implementations.

The method 400, illustrated in FIG. 4, is for effectuating modifications to a virtual space responsive to token detection, in accordance with one or more implementations.

At an operation 402, the virtual space may be implemented to determine views of the virtual space. Operation 402 may be performed by a space module that is the same as or similar to space module 210, in accordance with one or more implementations.

At an operation 404, one or more tokens may be detected based on signals received from a token reader. Operation 404 may be performed by a token detection module that is the same as or similar to token detection module 212, in accordance with one or more implementations.

At an operation 406, a modification may be effectuated to one or more aspects of the virtual space responsive to detection of a first token. Operation 406 may be performed by a virtual space modification module that is the same as or similar to virtual space modification module 214, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An apparatus configured to be detected by a token reader to effectuate a modification to a virtual space, the apparatus comprising:
a token configured to be detected using a token reader, the token being detectable based on a first signal conveying information associated with the token, the token being a standalone physical object, detection of the token effectuating a modification to one or more attributes of the virtual space that identify a condition of the virtual space, the virtual space being provided by a virtual space platform in communication with the token reader, wherein virtual space content associated with the modification to the one or more attributes of the virtual space that identify the condition of the virtual space is stored at a location other than the token, and wherein the one or more attributes of the virtual space that identify the condition of the virtual space include one or both of laws of nature of the virtual space, or weather depicted in the virtual space.

2. The apparatus of claim 1, wherein the token is configured to be removably attached to a first physical accessory, the first physical accessory being configured to depict one or both of a first character or a first virtual item, and wherein the token must be attached to the first physical accessory for the modification to the one or more aspects of the virtual space to be effectuated.

3. The apparatus of claim 1, wherein the token is configured to be removably attached to a surface of the token reader.

4. The apparatus of claim 1, wherein the token has a first overall shape, the first overall shape being different from the overall shapes of other tokens configured to be detected to effectuate modifications within the virtual space that are different from the modification to the one or more aspects of the virtual space.

5. The apparatus of claim 1, wherein detection of the token in combination with detection of one or more other tokens effectuates one or both of (1) a modification to one or more aspects of the virtual space or (2) a modification to one or both of a character or a virtual item within the virtual space.

6. The apparatus of claim 1, wherein the laws of nature of the virtual space include a simulation of gravity within the virtual space.

7. A system configured to detect a token to effectuate a modification to a virtual space, the system comprising:
one or more physical processors configured by machine-readable instructions to:
implement the virtual space to determine views of the virtual space;
detect tokens based on signals received from a token reader, a given token being a standalone physical object, the tokens including a first token, the first token being detectable based on a first signal conveying information associated with the first token; and
effectuate a modification to one or more attributes of the virtual space that identify a condition of the virtual space responsive to detection of the first token;
wherein virtual space content associated with the modification to the one or more attributes of the virtual space that identify the condition of the virtual space is stored at a location other than the first token; and
wherein the one or more attributes of the virtual space that identify the condition of the virtual space include one or both of laws of nature of the virtual space, or weather depicted in the virtual space.

8. The system of claim 7, wherein the first token is configured to be removably attached to a first physical accessory, and wherein the first token must be attached to the first physical accessory for the modification to the one or more aspects of the virtual space to be effectuated.

9. The system of claim 7, wherein detection of the first token in combination with detection of one or more other tokens effectuates one or both of (1) a modification to one or more aspects of the virtual space or (2) a modification to one or both of a character or a virtual item within the virtual space.

10. The system of claim 7, wherein the laws of nature of the virtual space include a simulation of gravity within the virtual space.

11. A computer-implemented method to effectuate a modification to a virtual space responsive to token detection, the method being performed by one or more processors configured to execute computer program modules, the method comprising:
implementing the virtual space to determine views of the virtual space;
detecting tokens based on signals received from a token reader, a given token being a standalone physical object, the tokens including a first token, the first token being detectable based on a first signal conveying information associated with the first token; and
effectuating a modification to one or more attributes of the virtual space that identify a condition of the virtual space responsive to detection of the first token;
wherein virtual space content associated with the modification to the one or more aspects of the virtual space is stored at a location other than the first token; and
wherein the one or more attributes of the virtual space that identify the condition of the virtual space include one or both of laws of nature of the virtual space, or weather depicted in the virtual space.

12. The method of claim 11, wherein the first token is configured to be removably attached to a first physical accessory, and wherein the first token must be attached to the first physical accessory for the modification to the one or more aspects to the virtual space to be effectuated.

13. The method of claim 11, further comprising:
detecting one or more other tokens; and
responsive to detection of the first token in combination with detection of the one or more other tokens, effectuating one or both of (1) a modification to one or more aspects of the virtual space or (2) a modification to one or both of a character or a virtual item.

14. The method of claim 11, wherein the laws of nature of the virtual space include a simulation of gravity within the virtual space.

* * * * *